(12) United States Patent
Kim et al.

(10) Patent No.: US 12,469,484 B2
(45) Date of Patent: Nov. 11, 2025

(54) FOREIGN LANGUAGE PRONUNCIATION ASSESSMENT APPARATUS AND CONTROL METHOD THEREOF

(71) Applicant: Kakao Enterprise Corp., Seongnam-si (KR)

(72) Inventors: Eui Sung Kim, Seongnam-si (KR); Hye Ji Seo, Seongnam-si (KR); Hong Lee, Seongnam-si (KR)

(73) Assignee: KAKAO ENTERPRISE CORP., Seongnam-si (KR)

( * ) Notice: Subject to any disclaimer, the term of this patent is extended or adjusted under 35 U.S.C. 154(b) by 875 days.

(21) Appl. No.: 17/725,632

(22) Filed: Apr. 21, 2022

(65) Prior Publication Data

US 2023/0290269 A1    Sep. 14, 2023

(30) Foreign Application Priority Data

Mar. 8, 2022    (KR) .......................... 10-2022-0029489

(51) Int. Cl.

| | | |
|---|---|---|
| *G10L 15/02* | (2006.01) | |
| *G10L 15/06* | (2013.01) | |
| *G10L 15/16* | (2006.01) | |
| *G10L 15/187* | (2013.01) | |
| *G10L 15/197* | (2013.01) | |
| *G10L 15/22* | (2006.01) | |

(52) U.S. Cl.
CPC ............ *G10L 15/02* (2013.01); *G10L 15/063* (2013.01); *G10L 15/187* (2013.01); *G10L 15/197* (2013.01); *G10L 15/22* (2013.01); *G10L 15/16* (2013.01)

(58) Field of Classification Search
CPC ..... G10L 15/02; G10L 15/063; G10L 15/187; G10L 15/197; G10L 15/22; G10L 15/16; G10L 15/065
See application file for complete search history.

(56) References Cited

U.S. PATENT DOCUMENTS

2018/0173571 A1* 6/2018 Huang .................. G06F 9/5044

OTHER PUBLICATIONS

B. Lin and L. Wang, "Attention-Based Multi-Encoder Automatic Pronunciation Assessment," ICASSP 2021—2021 IEEE International Conference on Acoustics, Speech and Signal Processing (ICASSP), Toronto, ON, Canada, 2021, pp. 7743-7747 (Year: 2021).*

* cited by examiner

*Primary Examiner* — Daniel C Washburn
*Assistant Examiner* — Penny L Caudle
(74) *Attorney, Agent, or Firm* — LRK PATENT LAW FIRM

(57) ABSTRACT

A technology for assessing foreign language pronunciation of a non-native learner is provided. The foreign language pronunciation assessment technology includes training an end-to-end speech recognizer with native speaker data, tuning the trained end-to-end speech recognizer with non-native speaker data, training a scoring module on the basis of the finely tuned end-to-end speech recognizer, and calculating, by the trained scoring module, a prediction score for non-native speaker speech input when the non-native speaker speech is input to the tuned end-to-end speech recognizer.

17 Claims, 10 Drawing Sheets

FIG. 6

| Method | KESL Holistic | Speechocean762 Accuracy | Speechocean762 Fluency | Speechocean762 Prosodic |
|---|---|---|---|---|
| GOP | 0.65 | 0.61 | 0.62 | 0.64 |
| Agg + Seq | 0.55 | 0.52 | 0.51 | 0.59 |
| Agg + Seq + GOP | 0.77 | 0.68 | 0.73 | 0.75 |
| 601 — wav2vec2-FT w/ Layer-wise Cont. (Proposed) | 0.80 | 0.72 | 0.80 | 0.82 |

FIG. 7

| Pretrained | KESL | Speechocean762 | | |
| --- | --- | --- | --- | --- |
| | Holistic | Accuracy | Fluency | Prosodic |
| wav2vec2-PT | 0.75 | 0.64 | 0.79 | 0.81 |
| wav2vec2-FT | 0.80 | 0.72 | 0.80 | 0.82 |

FIG. 8

| Feature | KESL | | Speechocean762 | | |
|---|---|---|---|---|---|
| | Holistic | Accuracy | Fluency | Prosodic |
| Local. | 0.55 | 0.46 | 0.57 | 0.60 |
| Last Cont. | 0.78 | 0.69 | 0.78 | 0.80 |
| Layer-wise Cont. | 0.80 | 0.72 | 0.80 | 0.82 |

FIG. 9

| Scoring Module | KESL | Speechocean762 | | |
| --- | --- | --- | --- | --- |
| | Holistic | Accuracy | Fluency | Prosodic |
| LR | 0.75 | 0.68 | 0.75 | 0.77 |
| MLP | 0.78 | 0.70 | 0.77 | 0.79 |
| Ours | 0.80 | 0.72 | 0.80 | 0.82 |

FOREIGN LANGUAGE PRONUNCIATION ASSESSMENT APPARATUS AND CONTROL METHOD THEREOF

CROSS-REFERENCE TO RELATED APPLICATION

This application claims priority to Korean Patent Application No. 10-2022-0029489, filed on Mar. 8, 2022, and all the benefits accruing therefrom under 35 U.S.C. § 119, the contents of which are incorporated by reference in their entirety.

BACKGROUND

1. Field of the Invention

The present disclosure relates to a technology for assessing foreign language utterance of a non-native speaker, and more particularly, to a technology for recognizing foreign language utterance using an end-to-end speech recognizer and calculating an assessment score on the basis of the recognition result.

2. Description of Related Art

Due to globalization, as an English-as-a-second-language (ESL) learner demands to improve his/her English pronunciation, a computer-assisted pronunciation training (CAPT) system is attracting attention as an English learning service. In order to implement the CAPT system, a mispronunciation detection and diagnosis (MDD) technology and a pronunciation assessment technology are required.

Most previous studies have estimated a pronunciation assessment score using an automatic speech recognition (ASR) system and acoustic characteristics. In addition, many studies have utilized acoustic characteristics, including prosododic, intensity, rhythm, and cepstrum, in order to assess pronunciation.

However, in the case of an existing pronunciation assessment technology, there was a problem that in general, a task of forced alignment had to be preceded for a pronunciation assessment engine. In addition, there was a problem that text information on utterance is required for training the automatic speech recognition system.

Recently, a transformer structure-based end-to-end speech recognizer shows excellent results in ASR, emotion recognition, language identification, etc.

Accordingly, there is a need for research on a technology that can assess pronunciation of a non-native speaker on the basis of the transformer structure-based end-to-end speech recognizer that does not require forced alignment or text information about utterance.

SUMMARY

The present disclosure provides a foreign language pronunciation assessment apparatus and a control method thereof for analyzing utterance of a learner and calculating a pronunciation assessment score.

The present disclosure provides a foreign language pronunciation assessment apparatus and a control method thereof for increasing the reliability of pronunciation assessment on the basis of the utilization of a transformer structure-based end-to-end speech recognizer.

Embodiments of the present disclosure are not limited to the foreign language pronunciation assessment apparatuses and the control methods thereof described above, and other embodiments not described may be clearly understood by those of ordinary skill in the art to which the present disclosure belongs from the description below.

In accordance with an exemplary embodiment of the present invention, there is provided a control method of a foreign language pronunciation assessment apparatus, the method including training an end-to-end speech recognizer based on a transformer structure with native speaker data, tuning the trained end-to-end speech recognizer with non-native speaker data, training a scoring module on the basis of the tuned end-to-end speech recognizer, and calculating, by the trained scoring module, a prediction score for non-native speaker speech input when the non-native speaker speech is input to the tuned end-to-end speech recognizer.

The training of the scoring module may be performed on the basis of supervised learning data, and the supervised learning data may be data in which an assessment score is stored by being labeled for each of at least one of the non-native speaker speech.

The end-to-end speech recognizer based on the transformer structure may be configured to include a convolutional encoder and a transformer, and the transformer may be configured to include at least one encoder layer.

When speech is input to the end-to-end speech recognizer, the speech may sequentially pass through the convolutional encoder and the at least one encoder layer.

The calculating of the prediction score may include receiving, by the tuned end-to-end speech recognizer, the non-native speaker speech included in the supervised learning data, calculating at least one hidden state of context representations that is an output of each of the at least one layer, and calculating layer-wise context representations by adding the calculated at least one hidden state of context representations.

The calculating of the prediction score may include inputting the calculated layer-wise context representations into the scoring module, applying pointwise convolution to the input layer-wise context representations, applying global average pooling (GAP) to the layer-wise context representations to which the pointwise convolution is applied, and calculating the prediction score by applying a linear layer to the layer-wise context representations to which the global average pooling is applied.

The training of the scoring module may include calculating a loss $\mathcal{L}_{MSE}$ on the basis of the calculated prediction score and the assessment score labeled for the input non-native speaker speech, and updating parameters of the scoring module in the direction in which the loss $\mathcal{L}_{MSE}$ is minimized (optimized).

The loss a $\mathcal{L}_{MSE}$ may be a mean squared error between the prediction score and the assessment score.

The prediction score may be a result obtained by applying a Rectified Linear Unit (ReLU) to an output of the linear layer.

In accordance with another exemplary embodiment of the present invention, there is provided a foreign language pronunciation assessment apparatus including an end-to-end speech recognizer configured to recognize non-native speaker speech based on a transformer structure and a scoring module configured to calculate a prediction score for the non-native speaker speech on the basis of an output of the end-to-end speech recognizer, in which the end-to-end speech recognizer is trained with native speaker data and tuned with non-native speaker data.

The scoring module may be performed on the basis of supervised learning data, and the supervised learning data may be data stored in which an assessment score is stored by being labeled for each of at least one of the non-native speaker speech.

The end-to-end speech recognizer may be configured to include a convolutional encoder and a transformer, and the transformer may be configured to include at least one encoder layer.

When speech is input to the end-to-end speech recognizer, the speech may sequentially pass through the convolutional encoder and the at least one encoder layer.

The tuned end-to-end speech recognizer, when the non-native speaker speech included in the supervised learning data is received, may be configured to calculate at least one hidden state of context representations that is an output of each of the at least one layer, and calculate layer-wise context representations by adding the calculated at least one hidden state of context representations.

The scoring module, when the calculated layer-wise context representations are input in calculating the prediction score, may be configured to calculate the prediction score by applying pointwise convolution to the input layer-wise context representations, applying global average pooling (GAP) to the layer-wise context representations to which the pointwise convolution is applied, and applying a linear layer to the layer-wise context representations to which the global average pooling is applied.

In training the scoring module, a loss $\mathcal{L}_{MSE}$ may be calculated based on the calculated prediction score and the assessment score labeled for the input the non-native speaker speech, and parameters of the scoring module may be updated in the direction in which the calculated loss $\mathcal{L}_{MSE}$ is minimized (optimized).

The loss $\mathcal{L}_{MSE}$ may be a mean squared error between the prediction score and the assessment score.

The prediction score may be a result obtained by applying a Rectified Linear Unit (ReLU) to an output of the linear layer.

BRIEF DESCRIPTION OF THE DRAWINGS

Exemplary embodiments can be understood in more detail from the following description taken in conjunction with the accompanying drawings, in which:

FIG. 6 illustrates a table comparing performance of a proposed method in terms of the PCC with various approaches based on the first data set (KESL; English pronunciation dataset containing speech of Korean children) and the second data set ("Speechocean762 data set) in accordance with still another exemplary embodiment;

FIG. 7 illustrates a table comparing experimental results of a model subjected to only pre-training and a model subjected to the pre-training and tuning in accordance with still another exemplary embodiment;

FIG. 8 illustrates a comparison table for three types of representations in accordance with still another exemplary embodiment; and FIG. 9 illustrates a table containing comparison results of a scoring module 120 in accordance with still another exemplary embodiment.

DETAILED DESCRIPTION OF EMBODIMENTS

Figure 1:
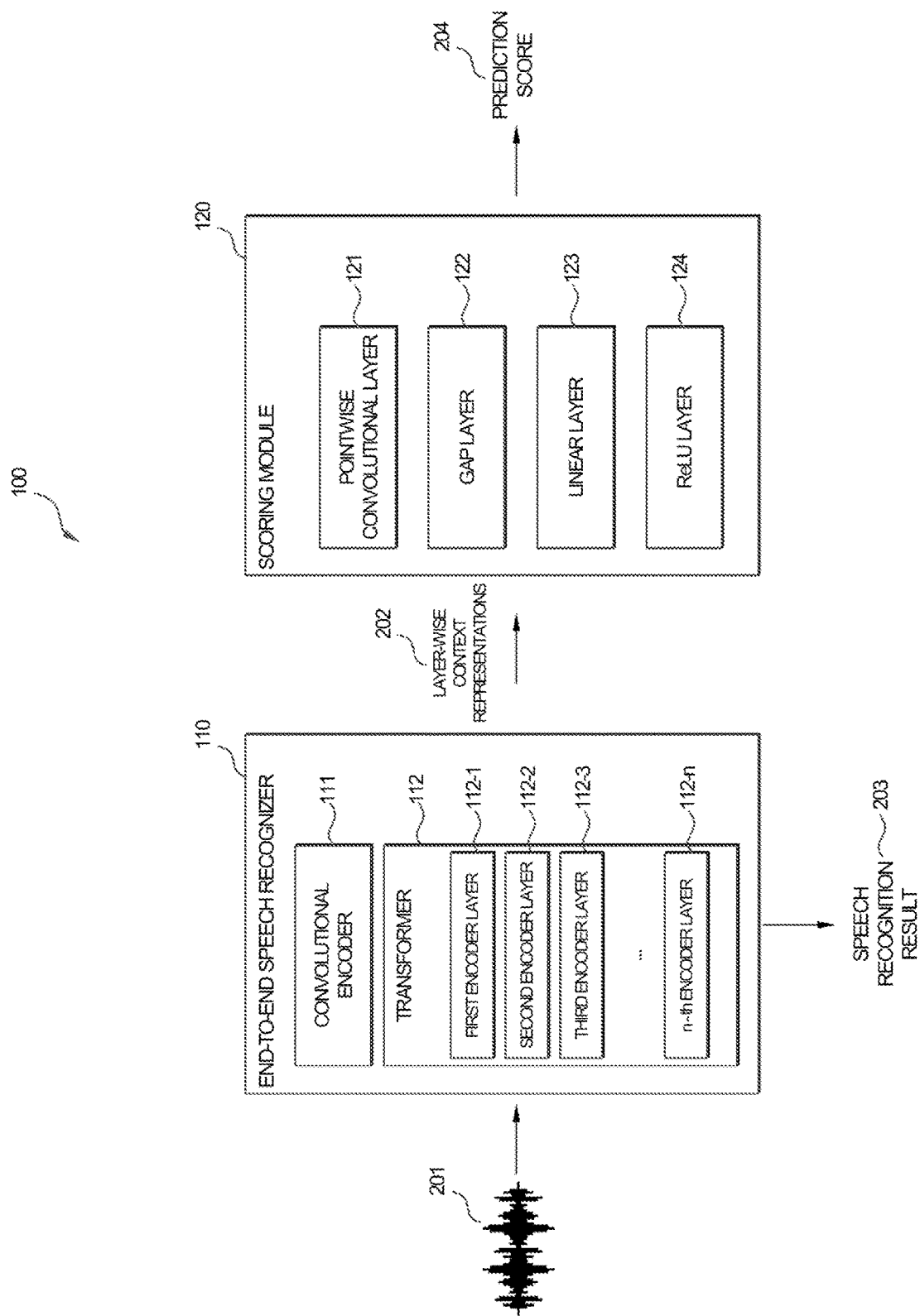
FIG. 1 is a diagram illustrating a block diagram of an end-to-end speech recognizer-based foreign language pronunciation assessment apparatus 100 in accordance with exemplary embodiment of the present invention.

Hereinafter, the embodiments disclosed in the present specification will be described in detail with reference to the accompanying drawings, but the same or similar components are assigned the same reference numbers regardless of reference numerals, and redundant description thereof will be omitted. The suffixes "module" and "unit" for the components used in the following description are given or mixed in consideration of only the ease of drafting the specification, and do not have distinct meanings or roles in themselves. In addition, in describing various embodiments disclosed in this specification, when it is determined that a detailed description of a related known technology may obscure the gist of the embodiments disclosed in the present specification, the detailed description thereof will be omitted. In addition, the accompanying drawings are only for easy understanding of the embodiments disclosed in this specification, and the technical spirit disclosed herein is not limited by the accompanying drawings, and should be understood to include all modifications, equivalents and substitutes included in the spirit and scope of the present invention.

Terms including an ordinal number, such as first, second, etc., may be used to describe various components, but the components are not limited by the terms. The above terms are used only for the purpose of distinguishing one component from another.

When a component is referred to as being "connected" or "coupled" to another component, it may be directly connected or coupled to the other component, but it should be understood that another component may exist in between. On the other hand, when it is mentioned that a certain element is "directly connected" or "directly coupled" to another element, it should be understood that no other element is present in the middle.

The singular expression may include the plural expression unless the context clearly dictates otherwise.

In the present application, it should be understood that terms such as "comprises" or "have" are intended to designate that a feature, number, step, operation, component, part, or combination thereof described in the specification exists, and do not preclude the possibility of addition or existence of one or more other features or numbers, steps, operations, components, parts, or combinations thereof.

Hereinafter, specific embodiments will be described in detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

In the figures, the dimensions of layers and regions are exaggerated for clarity of illustration. Like reference numerals refer to like elements throughout. It will also be understood that when a layer, a film, a region or a plate is referred to as being 'on' another one, it can be directly on the other one, or one or more intervening layers, films, regions or plates may also be present. Further, it will be understood that when a layer, a film, a region or a plate is referred to as being 'under' another one, it can be directly under the other one, and one or more intervening layers, films, regions or plates may also be present. In addition, it will also be understood that when a layer, a film, a region or a plate is referred to as being 'between' two layers, films, regions or plates, it can be the only layer, film, region or plate between the two layers, films, regions or plates, or one or more intervening layers, films, regions or plates may also be present.

FIG. 1 is a diagram illustrating a block diagram of an end-to-end speech recognizer-based foreign language pronunciation assessment apparatus 100 according to an embodiment of the present disclosure.

Figure 2:
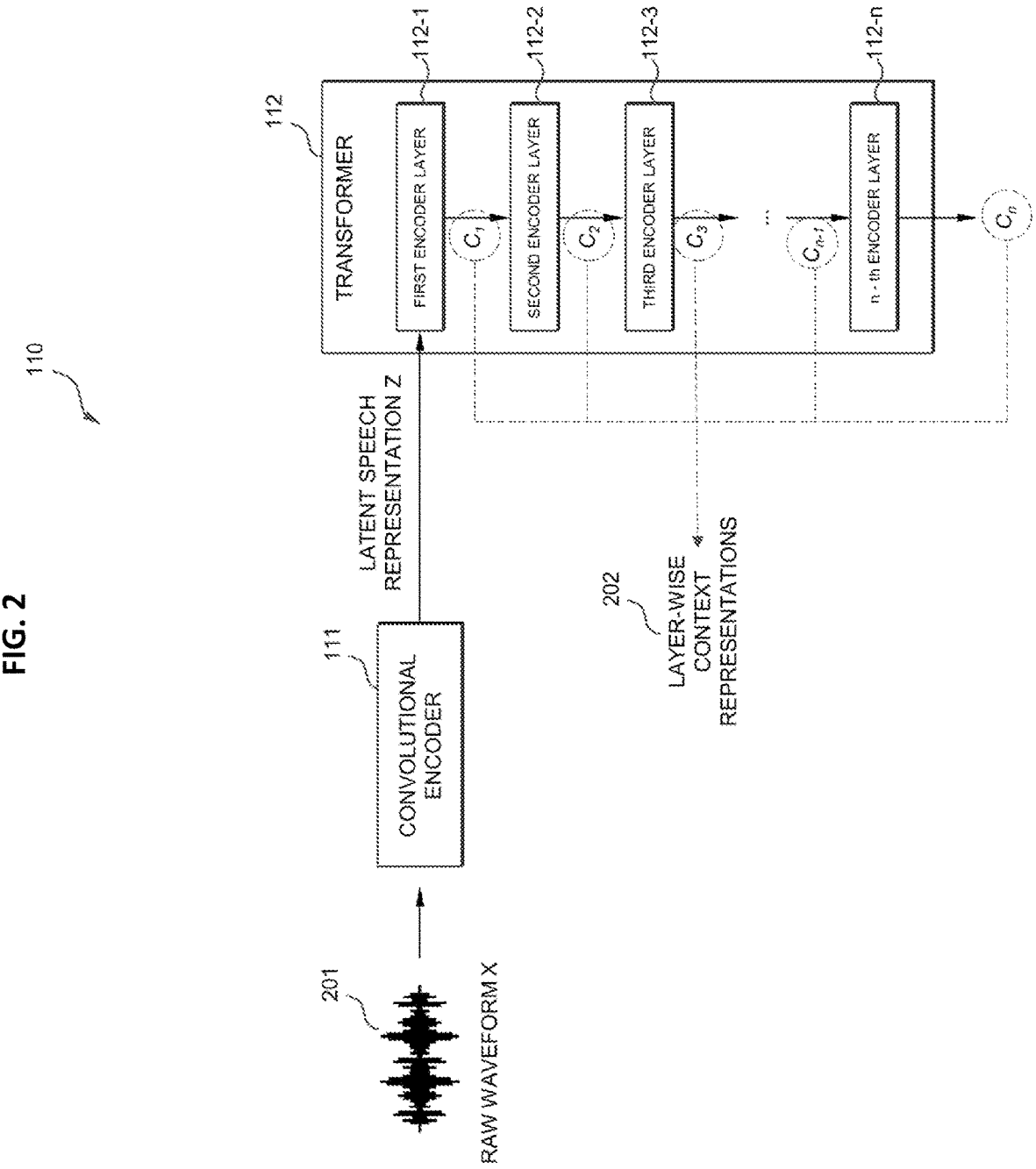
FIG. 2 is a diagram for describing a detailed structure of an end-to-end speech recognizer 110 in accordance with an exemplary embodiment of the present invention.

FIG. 2 is a diagram for describing a detailed structure of an end-to-end speech recognizer 110 according to an embodiment of the present disclosure.

Hereinafter, description it will be made with reference to FIGS. 1 and 2 together.

The components illustrated in FIG. 1 are not essential in implementing the foreign language pronunciation assessment apparatus 100, and thus the foreign language pronunciation assessment apparatus 100 described in this specification may include more or fewer components than those listed above.

In many research results, it has been shown that speech representation learned using the end-to-end speech recognizer 110 based on a transformer structure is effective in encoding various speech-related characteristics.

Accordingly, in the present disclosure, a non-native speaker pronunciation assessment technology on the basis of the end-to-end speech recognizer 110 based on the transformer structure is proposed.

In the present disclosure, it is proposed to utilize the end-to-end speech recognizer 110 that has been trained with native speaker data, adjust the end-to-end speech recognizer 110 with non-native speaker data, and then calculate the prediction score using the layer-wise context representations.

In an embodiment of the present disclosure, native speaker data refers to data on a speech (hereinafter referred to as native speaker speech) of a person whose native language is an analysis target language, and data in which information (correct answer data) labeled for each of at least one native speaker's speech is stored together.

In an embodiment of the present disclosure, non-native speaker data refers to data on the speech (hereinafter referred to as non-native speaker speech) of a person whose native language is a language other than the analysis target language and uses the analysis target language as a foreign language, and data in which information (correct answer data) labeled for each of at least one non-native speaker speech is stored together.

The foreign language pronunciation assessment apparatus 100 according to an embodiment of the present disclosure may be configured to include the end-to-end speech recognizer 110 and a scoring module 120.

The end-to-end speech recognizer 110 is configured to recognize input speech 201 when input speech 201 is received and output a speech recognition result 203 obtained by converting input speech 201 into text. The end-to-end speech recognizer 110 according to an embodiment of the present disclosure may be a speech recognizer on the basis of deep neural networks. As a representative example, the end-to-end speech recognizer 110 according to an embodiment of the present disclosure may be a wav2vec 2.0 speech recognizer based on a transformer structure.

In an embodiment of the present disclosure, it is proposed to utilize the fact that outputs of at least one transformer layer (encoder layer) constituting the end-to-end speech recognizer 110 include various information about the input speech for pronunciation assessment.

To this end, the end-to-end speech recognizer 110 according to an embodiment of the present disclosure may further output layer-wise context representations 202 separately from the output of the speech recognition result 203. The layer-wise context representations 202 according to an embodiment of the present disclosure refers to representations generated by combining outputs of at least one transformer layer (encoder layer) constituting the end-to-end speech recognizer 110.

The scoring module 120 is a neural network built on the end-to-end speech recognizer 110 or separately from the end-to-end speech recognizer 110, and is configured to output a prediction score 204 on the basis of the layer-wise context representations 202 output from the end-to-end speech recognizer 110. Here, the prediction score may be utterance level (utterance assessment) information indicating how good the pronunciation of the non-native speaker (English-as-a-second-language (ESL)) learner is.

The structure of the end-to-end speech recognizer 110 according to an embodiment of the present disclosure will be described in more detail. Referring to FIG. 2, the end-to-end speech recognizer 110 may be configured to include a convolutional encoder 111 and a transformer 112.

The convolutional encoder 111 includes a time-stack convolutional layer map that transforms a raw waveform X for the input speech 201 into latent speech representation (or local representation) Z. The convolutional encoder 111 may divide the input speech 201 at regular time intervals and output the latent speech representation Z by applying a convolutional neural network (CNN) thereto.

The transformer 112, as a context encoder, outputs contextual representation C when the latent speech representation Z is input.

The transformer 112 according to an embodiment of the present disclosure may be configured to include at least one encoder layer 112-1 to 112-$n$.

When speech is input to the end-to-end speech recognizer 110, the input speech may sequentially pass through the convolutional encoder 111 and the at least one encoder layer 112-1 to 112-$n$.

More specifically, when the input speech 201 in the form of the raw waveform X enters the convolutional encoder 111, the latent speech representation Z is output. This latent speech representation form Z is input to the first encoder layer 112-1, and a first context representation form $C_1$ is output. The first context representation $C_1$ again passes through the second and third encoder layers 112-2 to the final nth encoder layer 112-$n$, and the first to nth context representations $C_1$ to $C_n$ may be sequentially obtained.

The nth context representation $C_n$ that is the output of the final nth encoder layer 112-$n$ is referred to as the final context representation $C_n$.

As described above, each of the first to nth context representations $C_1$ to $C_n$, which are the outputs of the encoder layers 112-1 to 112-$n$, contains various acoustic and language information for the input speech 201. That is, the first to nth context representations $C_1$ to $C_n$ may be regarded as effective in learning pronunciation-related information.

Therefore, in one embodiment of the present disclosure, it is proposed to derive the layer-wise context representations 202 on the basis of the first to nth context representations $C_1$ to $C_n$, and utilize the layer-wise context representations 202 in assessing the pronunciation of the input speech 201.

The layer-wise context representations 202 according to an embodiment of the present disclosure is proposed to be calculated by summing the first to nth context representations $C_1$ to $C_n$.

The layer-wise context representations 202 according to another embodiment of the present disclosure is proposed to be calculated by applying different weights to the first to nth context representations $C_1$ to $C_n$, respectively, and then, summing the results obtained by applying the weights.

Referring back to FIG. 1, the scoring module 120 according to an embodiment of the present disclosure may be configured to include a pointwise convolutional layer 121, a GAP layer 122, a linear layer 123 and a ReLU layer 124.

The pointwise convolution layer 121 performs pointwise convolution on the layer-wise context representations 202 input to the scoring module 120.

The GAP layer 122 performs global average pooling (GAP) on the layer-wise context representations 202 for which the pointwise convolution is performed.

The linear layer 123 applies at least one of a weight and an offset to the result subjected to global average pooling.

The rectified linear unit (ReLU) layer 124 has a configuration for activating ReLU for the output of the linear layer 123.

Hereinafter, a control sequence of the foreign language pronunciation assessment apparatus 100 will be described with reference to FIG. 3.

Figure 3:
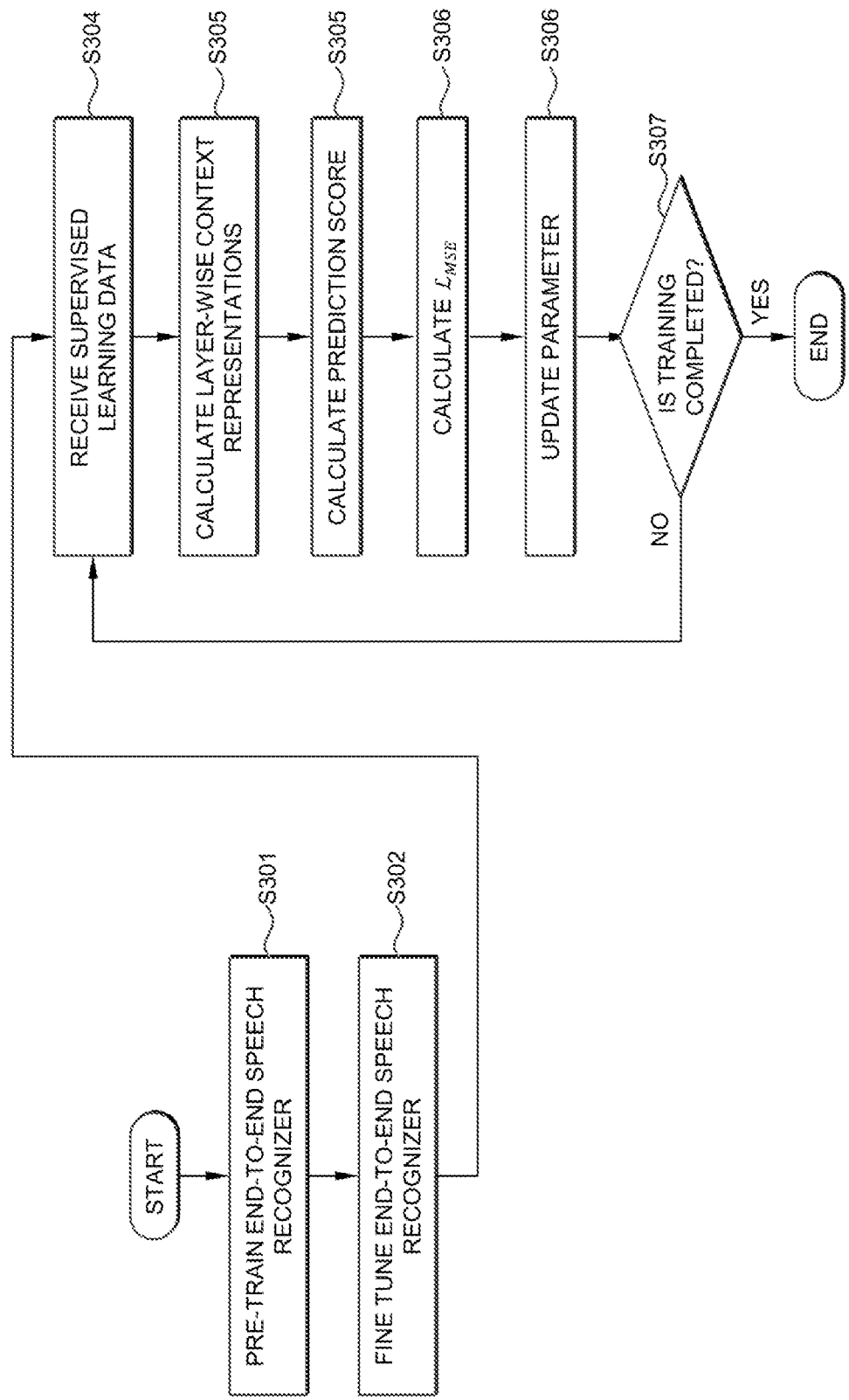
FIG. 3 illustrates a training flowchart of the foreign language pronunciation assessment apparatus 100 in accordance with another exemplary embodiment.

FIG. 3 illustrates a training flow chart of the foreign language pronunciation assessment apparatus 100 according to an embodiment of the present disclosure.

In step S301, the foreign language pronunciation assessment apparatus 100 pre-trains the end-to-end speech recognizer 110. In this case, the pre-training may be performed on the basis of native speaker data.

When the input speech 201 is transformed into the latent speech representation Z by the convolutional encoder 111, the latent speech representation Z is quantized into quantized embedding Z with a fixed number of latent speech representations Z stored in a codebook for a prediction task. A contrastive score between the context representation C and the vector quantized embedding Z is maximized through a network training process.

In step S302, the foreign language pronunciation assessment apparatus 100 may tune the end-to-end speech recognizer 110. As described above, the tuning may be performed on the basis of non-native speaker data.

Tuning according to an embodiment of the present disclosure refers to performing additional training for the end-to-end speech recognizer 110, which has been previously trained by general training data, using training data suitable for a specific purpose. When the additional training is performed, at least one parameter included in the end-to-end speech recognizer 110 may be updated.

The final context representation $C_n$ of the transformer 112 may be convolved using a 1D convolutional layer and then input to a softmax layer. The parameters included in the at least one encoder layer 112-1 to 112-$n$ are tuned so as to be optimized to $\mathcal{L}_{CTC}$, which is a CTC loss.

It is possible to perform a training process (steps S304 to S307) for the scoring module 120 on the basis of the end-to-end speech recognizer 110 that has been tuned.

First, in step S304, the foreign language pronunciation assessment apparatus 100 receives supervised learning data. In this case, the supervised learning data may be data in which the assessment score is labeled for each of at least one non-native speaker speech. The labeled assessment score may be a human-annotated score that is directly assessed by a person.

For each of at least one non-native speaker speech included in the supervised learning data, steps S305 to S307 may be repeatedly performed.

In step S305, the end-to-end speech recognizer 110 may calculate the layer-wise context representations on the basis of the input non-native speaker's speech. The scoring module 120 calculates a prediction score on the basis of the calculated layer-wise context representations. A detailed process for calculating the prediction score will be described later with reference to the flowchart of FIG. 4.

The calculated prediction score may be compared with the human-annotated score labeled for the input non-native speaker's speech. The loss for the comparison result of these two scores is expressed as $\mathcal{L}_{MSE}$.

The loss $\mathcal{L}_{MSE}$ may be a mean squared error between the prediction score and the assessment score.

In step S306, the foreign language pronunciation assessment apparatus 100 updates the parameters of the scoring module 120. In this case, the parameters may be updated in a direction in which the loss $\mathcal{L}_{MSE}$ is minimized (optimized).

In step S307, the foreign language pronunciation assessment apparatus 100 repeats steps S304 to S306 if training is not completed. It may be determined whether or not training has been completed on the basis of whether or not the training has been performed for all of at least one non-native speaker speech included in the supervised learning data.

Subsequently, a control method in which the foreign language pronunciation assessment apparatus 100 calculates the prediction score on the basis of the input speech 201 will be described with reference to FIG. 4.

Figure 4:
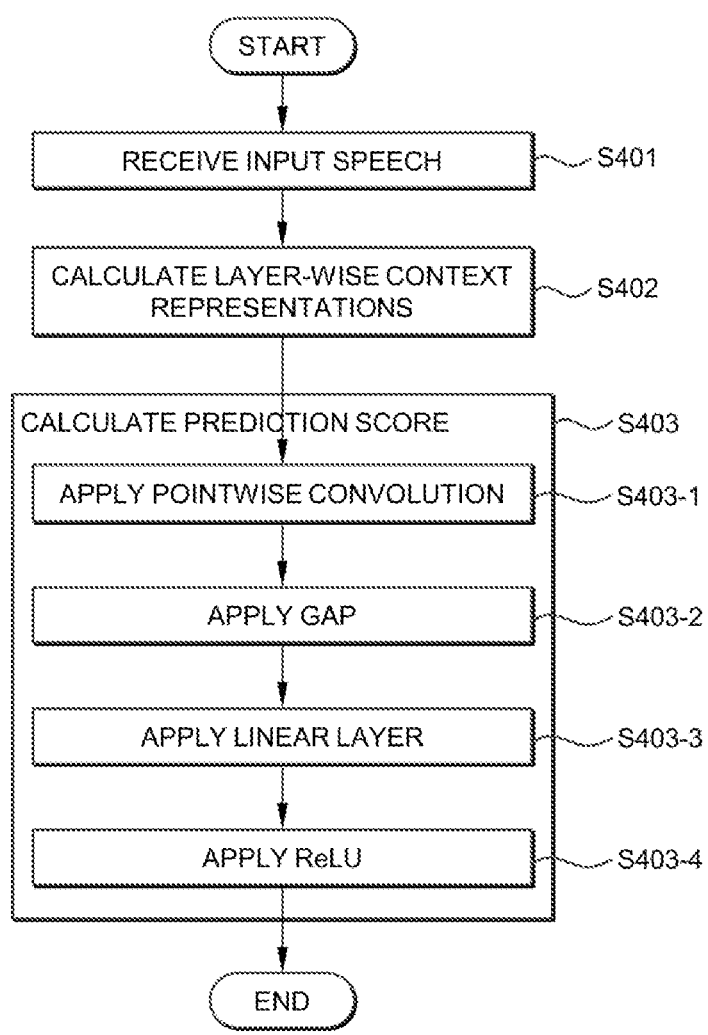
FIG. 4 is a prediction score calculation flowchart of the foreign language pronunciation assessment apparatus 100 in accordance with another exemplary embodiment.

FIG. 4 is a prediction score calculation flowchart of the foreign language pronunciation assessment apparatus 100 according to an embodiment of the present disclosure.

First, in step S401, the end-to-end speech recognizer 110 receives the input speech 201. In this case, the input speech 201 may be speech of a non-native speaking learner.

The end-to-end speech recognizer 110 calculates the layer-wise context representations in step S402, and delivers the layer-wise context representations to the scoring module 120.

The scoring module 120 calculates the prediction score on the basis of the layer-wise context representations (S403).

When describing step S403 of calculating the prediction score in more detail, in step S403-1, the pointwise convolution layer 121 of the scoring module 120 applies the pointwise convolution to the input layer-wise context representations.

Subsequently, in step S403-2, the GAP layer 122 of the scoring module 120 applies global average pooling (GAP) to the result obtained by applying the pointwise convolution thereto.

In step S403-3, the linear layer 123 of the scoring module 120 applies at least one of a weight and an offset to the result obtained by applying the global average pooling thereto.

Finally, in step S403-4, the ReLU layer 124 of the scoring module 120 applies ReLU to the output result of the linear layer 123.

Hereinafter, description will be made on performance test results for the foreign language pronunciation assessment apparatus 100 according to the method described above.

Figure 5:
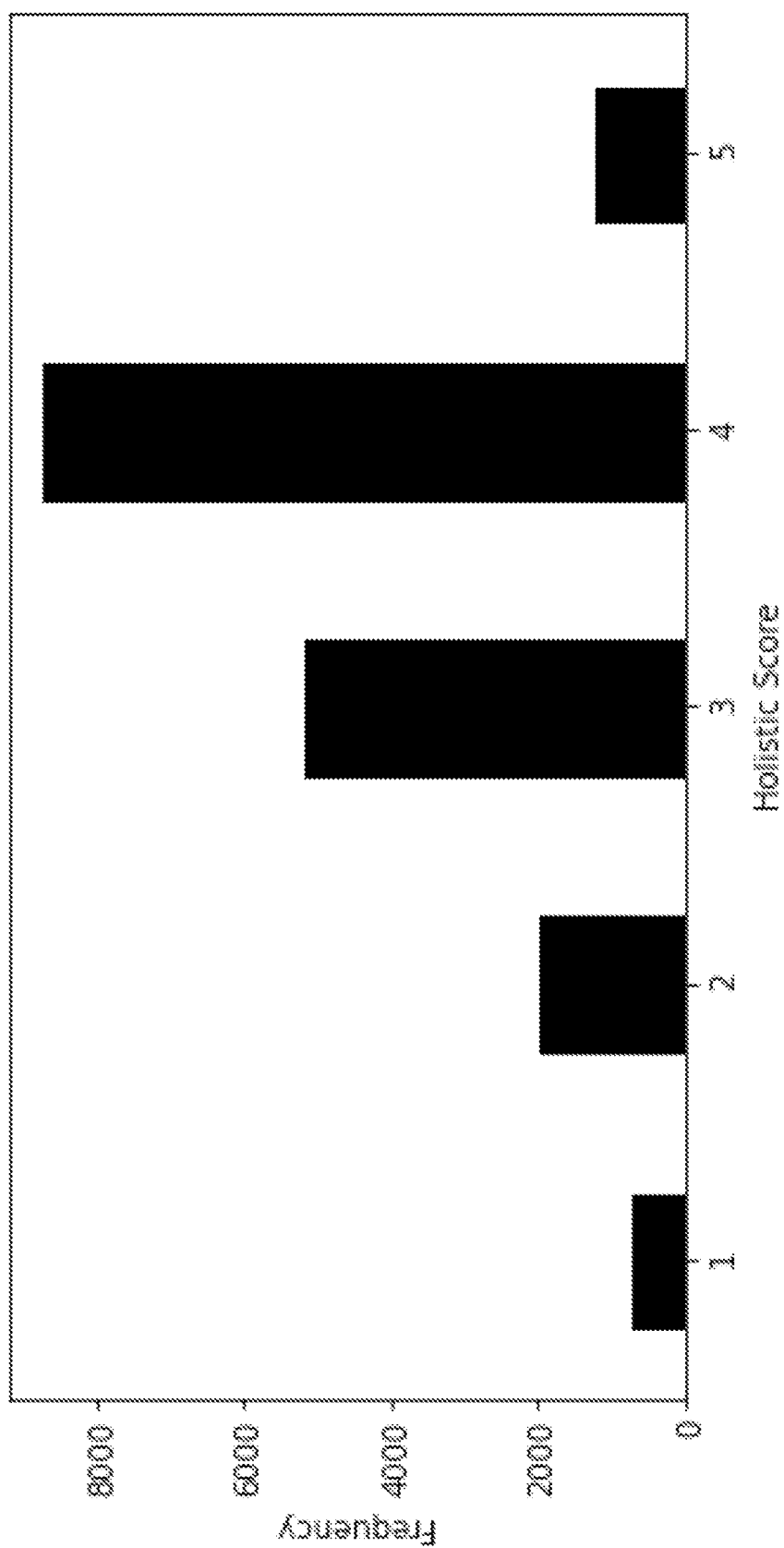
FIG. 5 illustrates a distribution of scores of a first data set given assessment scores by native-speaking experts in accordance with still another exemplary embodiment.

FIG. 5 illustrates a distribution of scores of a first data set given assessment scores by native-speaking experts.

In order to perform the pronunciation assessment of non-native speakers, two datasets were used in which assessment score labeling was performed by native-speaking experts to demonstrate the effectiveness of the proposed method.

The first data set is an in-house data set recorded by Korean children ESL learners (KESL). This data set consists of approximately 17,800 utterances from approximately 300 Korean speakers aged 10 to 12 years old.

Five native speaker experts scored pronunciation assessment for the first data set using five pronunciation continuum scales from 1 to 5, including overall pronunciation impression, segmental accuracy, stress, pause, and intonation.

Scores for the level of utterance were obtained by averaging the scores assessed by five experts for each label. FIG. 5 illustrates the overall score distribution of the first data set.

The second data set is a public data set called "Speechocean762".

The second data set contains approximately 5000 English sentences recorded by approximately 250 non-native English speakers, and the gender and age of the speakers are proportionally balanced.

The second dataset gives multidimensional scores such as accuracy, completeness, fluency, and prosododic in terms of word level, phoneme level and sentence level.

Each dataset is divided into a training set and a test set at a ratio of 5:5, and a sampling rate of all speech data is approximately 16,000 Hz.

In order to construct basic features, the time-aggregated features, the time-sequence handcraft acoustic features, the goodness of pronunciation (GOP), and combination features thereof used in other studies in the past.

The ASR system used in this experiment is our own DNN-HMM hybrid ASR system trained with approximately 4,000 hours of native speaker speech data and non-native speaker speech data.

In addition, the time-set feature AggFeat, which was in previous work based on "SpeechRater" related to several aspects of speech construction, including fluency, rhythm, intonation, stress, pronunciation, grammar, and vocabulary usage, was utilized.

Feature-wise zero mean and unit variance normalization were used for all functions.

After averaging the segment features along the time dimension using GAP and merging them into the basic features, two linear layers containing 256 and 1 units, respectively, were applied in order to predict the pronunciation score.

In this experiment, the pre-trained wav2vec2-large-lv60 model 1 was used. For tuning (fine tuning), the Adam optimization program was used, where the learning rate was warmed up from 1e-4 in 1k warm-up steps using the following matters.

The vocabulary for training the model pre-trained with CTC consisted of all unique characters of training and test data, including spaces and unknown tokens.

For all scoring modules, approximately 10% of the training set was randomly chosen as a validation set and the model was trained using the Adam optimizer with a learning rate of 1e4 and an early stop with a tolerance for validation loss of 10.

In order to assess the model, a comparison is made between the PCC of the prediction score and the PCC of the score assessed by a native speaker. A 10-fold cross-validation method was used based on the speaker.

FIG. 6 illustrates a table comparing performance of a proposed method in terms of the PCC with various approaches based on the first data set (KESL; English pronunciation dataset containing speech of Korean children) and the second data set ("Speechocean762 data set).

As shown in FIG. 6, data (601, wav2vec2-FT w/Layer-wise Cont. (Proposed)) on the foreign language evaluation apparatus 100 according to an embodiment of the present invention show better results than the model that is used in all cases in the "Holistic" of the first data set (KESL data set) and the second data set (Speechocean762 data set) labeled with three types of labels.

The results of FIG. 6 show that the wav2vec 2.0 encoder effectively learned pronunciation-related representations and improved the pronunciation assessment task performance.

Hereinafter, an experiment to confirm the effect of fine tuning based on non-native speaker data is described.

FIG. 7 illustrates a table comparing the experimental results of the model subjected only to pre-training and a model subjected to the pre-training and tuning.

For accurate comparison, the layer-wise context representation was used for each of the model that was subjected only to pre-training and the model that was subjected to the pre-training and fine tuning. The model subjected to the pre-training and fine tuning is denoted by wav2vec2-FT, and the model subjected only to the pre-training is denoted by wav2vec2-PT.

It can be seen from FIG. 7 that the overall accuracy, fluency and prosododic of wav2vec2-FT outperformed the wav2vec-PT performance for the PCC on both the first data set (KESL) and the second data set (Speechocean762 data set) by approximately 0.05, 0.08, 0.01 and 0.01, respectively.

Therefore, it can be confirmed that the fine-tuned model (wav2vec2-FT) of the wav2vec 2.0 encoder is more effective compared to the pre-trained model (wav2vec2-PT) that is not adapted to the non-native speech data environment.

FIG. 8 illustrates a comparison table for three types of representations.

In order to better understand the efficiency of wav2vec 2.0 encoder representations for pronunciation, three types of representations were compared as illustrated in Table 3. In the table of FIG. 8, "Local." is the output of the convolutional encoder of wav2vec 2.0.

In the table of FIG. 8, "Last Cont." refers to the final context representation $C_n$ that is the output of the final encoder layer 112-$n$ (in FIG. 2 described above).

FIG. 8 shows that transformer-based representation in consideration of context information such as the layer-wise context representation 202 and the last context representation Last Cont. has better performance than "Local." which is the convolution-based function. In addition, it can be confirmed that the function of the layer-wise context representation 202 is superior to that of the last context representation Last Cont.

These results may mean that, as it is known that the encoder layers 112-1 to 112-$n$ in the transformer 112 of wav2vec 2.0 exhibit different speech properties, various information on the pronunciation function are included in the representations according to all encoder layers of wav2vec 2.0.

FIG. 9 illustrates a table containing the comparison results of the scoring module 120.

Referring to the results of FIG. 9, it can be confirmed that applying the proposed scoring module ('Ours' in the table of FIG. 9) leads to more improvement than other traditional regression methods (LR or MLP) tested.

Figure 10:
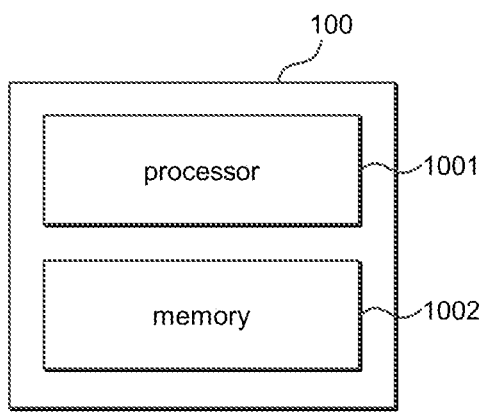
FIG. 10 is a diagram illustrating a configuration of the foreign language pronunciation assessment apparatus 100 according to an embodiment.

FIG. 10 is a diagram illustrating a configuration of the foreign language pronunciation assessment apparatus 100 according to an embodiment.

Referring to FIG. 10, the foreign language pronunciation assessment apparatus 100 includes a processor 1001 and a memory 1002. The memory 1002 stores one or more instructions executable by the processor 1001. The processor 1001 executes one or more instructions stored in the memory 1002. The processor 1001 may execute one or more operations described above with reference to FIGS. 1 to 4 by executing the instructions. In addition, the configuration of the present invention described above in conjunction with FIGS. 1 and 2 may be a configuration implemented by the instructions executed by the processor 1001.

The embodiments of the end-to-end speech recognizer-based foreign language pronunciation assessment apparatus and the method thereof according to the present disclosure, but this will be described as at least one embodiment. The technical spirit of the present disclosure and its configuration and operation are not limited by the embodiments, and the scope of the technical spirit of the present disclosure is not limited/limited by the drawings or the description with reference to the drawings. In addition, the concepts and embodiments of the invention presented in the present disclosure can be used by those of ordinary skill in the art as a basis for modifying or designing other structures in order to perform the same purpose of the present disclosure. Modified or changed equivalent structures by those of ordinary skill in the art to which the present disclosure pertains are bound by the technical scope of the present disclosure described in the claims, as long as it does not deviate from the spirit or scope of the invention described in the claims, various changes, substitutions, and alterations may be made thereto without departing from the spirit or scope of the invention described in the claims.

The effects of the utterance assessment technology according to the present disclosure will be described as follows.

According to at least one of the embodiments of the present disclosure, there is an advantage in that it is possible to provide a technique for analyzing utterance of a learner and calculating a pronunciation assessment score.

In addition, according to at least one of the embodiments of the present invention, there is an advantage in that the reliability of pronunciation assessment can be increased on the basis of the use of the transformer structure-based end-to-end speech recognizer.

In addition, there is an advantage in that forced alignment, which is generally used, does not need to be performed for a pronunciation assessment engine.

In addition, according to at least one of the embodiments of the present disclosure, there is an advantage in that pronunciation assessment can be performed even if there is no text information about the utterance.

Further scope of applicability of the present disclosure will become apparent from the following detailed description. However, various changes and modifications within the spirit and scope of the present invention can be clearly understood by those skilled in the art, and thus it should be understood that the detailed description and specific embodiments, such as preferred embodiments of the present invention, are given by way of illustration only.

Although the foreign language pronunciation assessment apparatus and control method thereof have been described with reference to the specific embodiments, they are not limited thereto. Therefore, it will be readily understood by those skilled in the art that various modifications and changes can be made thereto without departing from the spirit and scope of the present invention defined by the appended claims.

What is claimed is:

1. A control method of a foreign language pronunciation assessment apparatus, the control method comprising:
   training an end-to-end speech recognizer with native speaker data;
   tuning the trained end-to-end speech recognizer with non-native speaker data;
   training a scoring module on the basis of the tuned end-to-end speech recognizer;
   outputting, by the tuned end-to-end speech recognizer, layer-wise context representations when non-native speaker speech is input to the tuned end-to-end speech recognizer; and
   calculating, by the trained scoring module, a prediction score for evaluating a pronunciation of the input non-native speaker speech based on the layer-wise context representations,
   wherein the end-to-end speech recognizer is configured to include a plurality of encoder layers,
   wherein the layer-wise context representations are a combination of outputs of the plurality of encoder layers, and
   wherein, when speech is input to the end-to-end speech recognizer, the speech sequentially passes through the plurality of encoder layers.

2. The control method of claim 1, wherein:
   the training of the scoring module is performed on the basis of supervised learning data, and
   the supervised learning data is data in which an assessment score is stored by being labeled for each of at least one of the non-native speaker speech.

3. The control method of claim 2, wherein:
   the end-to-end speech recognizer is configured to include a convolutional encoder and a transformer, and
   the transformer is configured to include at least one encoder layer.

4. The control method of claim 3, wherein:
   when speech is input to the end-to-end speech recognizer, the input speech is input to the convolutional encoder and an output of the convolutional encoder is input to the at least one encoder layer.

5. The control method of claim 1, wherein the calculating of the prediction score includes:
   applying pointwise convolution to the input layer-wise context representations,
   applying global average pooling (GAP) to the layer-wise context representations to which the pointwise convolution is applied, and
   calculating the prediction score by applying a linear layer to the layer-wise context representations to which the global average pooling is applied.

6. The control method of claim 5, wherein the training of the scoring module includes:
   calculating a loss $\mathcal{L}_{MSE}$ was on the basis of the calculated prediction score and the assessment score labeled for the input non-native speaker speech, and updating parameters of the scoring module in the direction in which the loss $\mathcal{L}_{MSE}$ is minimized.

7. The control method of claim 6, wherein the loss $\mathcal{L}_{MSE}$ is a mean squared error between the prediction score and the assessment score.

8. The control method of claim 5, wherein the prediction score is a result obtained by applying a Rectified Linear Unit (ReLU) to an output of the linear layer.

9. A foreign language pronunciation assessment apparatus comprising:
   an end-to-end speech recognizer configured to recognize non-native speaker speech,
      wherein the end-to-end speech recognizer is configured to include a plurality of encoder layers,
      wherein, when speech is input to the end-to-end speech recognizer, the speech sequentially passes through the plurality of encoder layers, and
      wherein the end-to-end speech recognizer is configured to output layer-wise context representations that are a combination of outputs of the plurality of encoder layers in response to the input non-native speaker speech; and
   a scoring module configured to calculate a prediction score for the non-native speaker speech on the basis of the layer-wise context representations, wherein the end-to-end speech recognizer is trained with native speaker data and tuned with non-native speaker data.

10. The foreign language pronunciation assessment apparatus of claim 9, wherein:
   the training of the scoring module is performed on the basis of supervised learning data, and
   the supervised learning data is data stored in which an assessment score is stored by being labeled for each of at least one of the non-native speaker speech.

11. The foreign language pronunciation assessment apparatus of claim 9, wherein:
   the end-to-end speech recognizer is configured to include a convolutional encoder and a transformer, and
   the transformer is configured to include at least one encoder layer.

12. The foreign language pronunciation assessment apparatus of claim 11, wherein:
   when speech is input to the end-to-end speech recognizer, the speech sequentially passes through the convolutional encoder and the at least one encoder layer.

13. The foreign language pronunciation assessment apparatus of claim 9, wherein:
   the scoring module, when the calculated layer-wise context representations are input in calculating the prediction score, is configured to calculate the prediction score by applying pointwise convolution to the input layer-wise context representations, applying global average pooling (GAP) to the layer-wise context representations to which the pointwise convolution is applied, and applying a linear layer to the layer-wise context representations to which the global average pooling is applied.

14. The foreign language pronunciation assessment apparatus of claim 13,
   wherein in training the scoring module,
   a loss $\mathcal{L}_{MSE}$ is calculated based on the calculated prediction score and the assessment score labeled for the input the non-native speaker speech, and
   parameters of the scoring module are updated in the direction in which the calculated loss $\mathcal{L}_{MSE}$ is minimized.

15. The foreign language pronunciation assessment apparatus of claim 14, wherein the loss $\mathcal{L}_{MSE}$ is a mean squared error between the prediction score and the assessment score.

16. The foreign language pronunciation assessment apparatus of claim 15, wherein the prediction score is a result obtained by applying a Rectified Linear Unit (ReLU) to an output of the linear layer.

17. A foreign language pronunciation assessment apparatus comprising:
   a processor; and
   a memory configured to store instructions executable by the processor,
   wherein the processor is configured to:
   recognize non-native speaker speech based on an end-to-end speech recognizer,
      wherein the end-to-end speech recognizer is configured to include a plurality of encoder layers,
      wherein, when speech is input to the end-to-end speech recognizer, the speech sequentially passes through the plurality of encoder layers, and
      wherein the end-to-end speech recognizer is configured to output layer-wise context representations that are a combination of outputs of the plurality of encoder layers in response to the input non-native speaker speech; and
   calculate a prediction score for the non-native speaker speech on the basis of the layer-wise context representations,
   wherein the end-to-end speech recognizer is trained with native speaker data and tuned with non-native speaker data.

* * * * *